J. P. EASTMAN.
MEANS AND METHOD FOR CONNECTING TUBING OF DISSIMILAR MATERIALS.
APPLICATION FILED JUNE 20, 1919.

1,398,634.

Patented Nov. 29, 1921.

WITNESS:

INVENTOR.
Joseph P. Eastman
BY
ATTORNEY.

UNITED STATES PATENT OFFICE.

JOSEPH PETER EASTMAN, OF MANITOWOC, WISCONSIN, ASSIGNOR TO EASTMAN MANUFACTURING COMPANY, OF MANITOWOC, WISCONSIN, A CORPORATION.

MEANS AND METHOD FOR CONNECTING TUBING OF DISSIMILAR MATERIALS.

1,398,634. Specification of Letters Patent. Patented Nov. 29, 1921.

Application filed June 20, 1919. Serial No. 305,715.

*To all whom it may concern:*

Be it known that I, JOSEPH P. EASTMAN, a citizen of the United States, and resident of Manitowoc, in the county of Manitowoc and State of Wisconsin, have invented certain new and useful Improvements in Means and Methods for Connecting Tubing of Dissimilar Materials; do hereby declare that the following is a full, clear, and exact description thereof.

My invention relates to an improved device for connecting sections of tubing of dissimilar materials and the means for applying the device.

I am well aware of the fact that various attempts have already been made for securing tubing of dissimilar materials together, for instance a tube section of rubber or compressible composition material upon a flexible metallic or incompressible tube, but all of these attempts have been more or less unsuccessful in view of the fact that the joints thus formed have not been gas tight. The cause of this usually lay in the fact that the retaining sleeve or band customarily applied had its ends not only forced inwardly into engagement with the compressible tube, but also toward each other, thus bulging or increasing the initial diameter of the intermediate portion. The points of contact between the retaining member and the compressible tube, and consequently between the latter and the incompressible tube, were very limited.

The purpose of the present invention, therefore, is to improve upon the old form of retaining sleeve or band and also the manner of applying the same so as to greatly increase the efficiency of the former and to permit an absolutely fluid tight joint to be formed between a tube of compressible material and a second tube of relatively incompressible material.

With this general object in view, the invention resides in the device and the manner of applying the same as depicted in the accompanying drawing, wherein.

Figure 1:
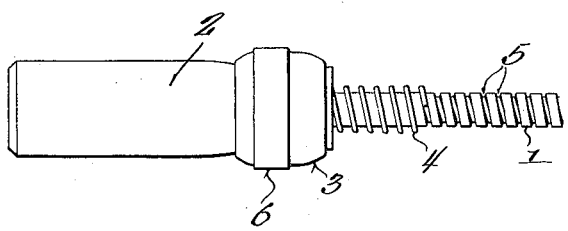
Figure 1 represents a side elevational view of one end of a flexible gas tube or the like having a connector band of rubber or of a composition material having similar properties, the latter being secured to the former by means of my improved retaining member.

From the accompanying drawing it will be seen that my invention is primarily adapted to be associated with flexible spirally wound metallic tubing 1 and rubber or composition material connector ends in the form of short tube sections 2. Tubing 1 of this nature is very generally used as piping for connecting a gas lamp or stove with a gas cock or other suitable source of supply, the connector ends 2 being secured to the ends of the tubing 1 to permit the ready attachment of the same to the gas appliance and gas cock.

In procuring a connection between one end of the piece of flexible tubing 1 and a tube section 2, said end of the former is inserted into one end of the latter and a sleeve or thimble 3 is disposed around the end portion of the tube section in which the end of the tubing 1 is placed. If considered necessary or desirable, that portion of the flexible tubing adjacent the tube section 2 may be reinforced by a helically coiled wire 4. The convolutions of the coil of wire are preferably disposed at the same angle as the convolutions of the spirally wound tubing whereby they will be received in the spiral groove 5 of the latter. Inasmuch as one end of the coil of wire projects a slight distance in the tube section 2, the clamping of the retaining sleeve 3 therearound will secure the wire against removal.

Figure 3:
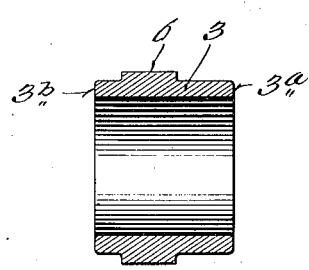
Fig. 3 is a longitudinal sectional view through one of the retaining members before the same is applied.

The preferred form of retaining sleeve or thimble that I employ is illustrated in Fig. 3, and the same consists of a circular member of appropriate length formed of lead, brass or any other readily bendable material. Formed integrally with said circular member and intermediate the ends thereof is provided an external, annular, reinforcing and guiding band 6. After considerable experimentation it has been discovered that the width, proportion with respect to the length of the sleeve, and the location of the band 6, when taken in connection with my improved applying dies, to be hereinafter described, plays a very important part in the efficiency and the operation of the retaining member. Therefore the distance between the end edge 3ᵃ of the sleeve and the adjacent edge of the band 6 is substantially equal to the latter, whereas the distance between the other edge 3ᵇ and the adjacent edge of the band is approximately one half the latter as clearly indicated in Fig. 3. The band is thus about two-fifths of the total length of the sleeve and is closer to one end edge than the other.

In utilizing a sleeve of this nature, it is slid upon the tube section 2 after the latter has received one end of a piece of tubing 1, the end edge 3ᵃ being disposed inwardly. The parts so associated are then placed in a female die 7, the same having a cylindrical bore 8 of a diameter substantially the same as the outer diameter of the reinforcing and guiding band 6, the latter being thus adapted to slidably engage the wall of said bore. One end portion of the bore is provided with an annular shoulder 9 which is inwardly inclined at an approximately sixty degree angle, this shoulder being adapted to be engaged by that portion of the sleeve 3 between the end edge 3ᵃ thereof and the adjacent edge of the band 6 to swage the same inwardly when pressure is applied to the other end of the sleeve.

Figure 2:
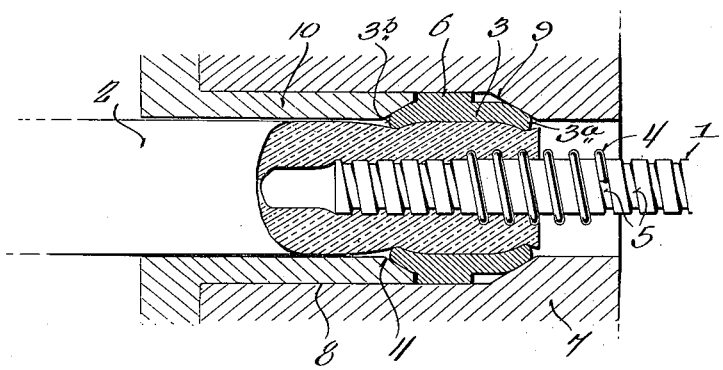
Fig. 2 is a longitudinal sectional view through the parts shown in Fig. 1 and the dies for applying the retaining member.

A male die 10 is designed for coöperation with the female die 7 and consists of a tubular member having an outer diameter substantially the same as that of the bore 8 and an inner diameter of sufficient size to receive the tube section 2. The inner end of the male die is beveled inwardly at an approximately sixty degree angle as at 11, this portion of the die being adapted to engage the part of the sleeve 3 between the edge 3ᵇ thereof and the adjacent edge of the band 6. From Fig. 2 it will be appreciated that the angle of inclination of the shoulder 9 extends in an opposite direction from that of the inclined end 11 of the male die 10, thus when the two dies are urged toward each other, the end portions of the sleeve 3 will be engaged therebetween and bent inwardly to compress the tube section 2.

Owing to the fact that the outer diameter of the band 6 is substantially the same as that of the bore 8, it is obvious that during such bending it is impossible for the diameter of the intermediate portion of the sleeve to change or increase. In this manner the compressible tube section 2 will be frictionally and tightly held in contact with the end of the tube 1 throughout the length of the sleeve 3. The proportionate size or width of the band 6 as above set forth prevents the sleeve from wabbling or moving out of absolute alinement with the longitudinal axis of the dies; a more perfect clamping or swaging is thus procured. In view of the fact that that portion of the sleeve adjacent the end edge 3ᵃ is wider than the opposite end portion, the shoulder 9 is preferably longer than the inclined end 11 of the male die 10, but because the angles in both cases are approximately sixty degrees, both end portions of the sleeve 3 will be operated upon at the same time and completed substantially at the same time.

Although I have illustrated and described one form of my invention, it is to be understood that various changes may well be made in the form and proportion of the several parts without sacrificing or departing from any of the principles thereof as outlined in the following claims.

I claim:

1. An article of the class described adapted to secure a relatively incompressible tube and a relatively compressible tube together comprising a non-resilient sleeve having an external combined reinforcing and guiding member disposed intermediate its ends, the end portions of the sleeve on each side of said member being adapted to be bent inwardly, the reinforcing and guiding member being adapted to slidably guide the sleeve in a suitable tool while the end portions are being bent.

2. An article of the class described adapted to secure a relatively incompressible tube and a relatively compressible tube together comprising a non-resilient sleeve having an intermediately located, external annular reinforcing band, the end portions of the sleeve on each side of the band being bent inwardly, the annular reinforcing band being adapted to slidably guide the sleeve in a suitable tool while the end portions are being bent.

3. An article of the class described adapted to secure a relatively incompressible tube and a relatively compressible tube together comprising a non-resilient sleeve having an external, annular reinforcing band, said band being approximately twice the distance from one end than the other, whereby when the end portions of the sleeve on each side of the band are bent in a suitable tool, the bend of the wider portion will be begun before the bend of the narrow portion, but the bending will be completed substantially simultaneously.

4. The hereindescribed method of forming a coupling which consists in disposing one end portion of a relatively incompressible tube in one end of a relatively compressible tube; disposing a bendable sleeve around the compressible tube, and bending the end portions of the sleeve inwardly to tightly grip the compressible tube and holding the intermediate portion of the sleeve against increasing beyond its initial diameter.

In testimony that I claim the foregoing I have hereunto set my hand at Manitowoc, in the county of Manitowoc and State of Wisconsin.

JOSEPH PETER EASTMAN.